(12) United States Patent
Sukhishvili et al.

(10) Patent No.: US 9,321,030 B2
(45) Date of Patent: Apr. 26, 2016

(54) CLAY-CONTAINING THIN FILMS AS CARRIERS OF ABSORBED MOLECULES

(71) Applicant: THE TRUSTEES OF THE STEVENS INSTITUTE OF TECHNOLOGY, Hoboken, NJ (US)

(72) Inventors: Svetlana Sukhishvili, Maplewood, NJ (US); Svetlana Pavlukhina, Bayonne, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 110 days.

(21) Appl. No.: 14/370,541

(22) PCT Filed: Dec. 18, 2012

(86) PCT No.: PCT/US2012/070306
§ 371 (c)(1),
(2) Date: Jul. 3, 2014

(87) PCT Pub. No.: WO2013/103514
PCT Pub. Date: Jul. 11, 2013

(65) Prior Publication Data
US 2015/0045207 A1 Feb. 12, 2015

Related U.S. Application Data

(60) Provisional application No. 61/583,049, filed on Jan. 4, 2012.

(51) Int. Cl.
*B01J 20/10* (2006.01)
*B01J 20/28* (2006.01)
(Continued)

(52) U.S. Cl.
CPC ............ *B01J 20/10* (2013.01); *B01J 20/28035* (2013.01); *B01J 20/3236* (2013.01); *B01J 20/3289* (2013.01); *C08K 3/34* (2013.01); *C08K 9/08* (2013.01)

(58) Field of Classification Search
None
See application file for complete search history.

(56) References Cited

U.S. PATENT DOCUMENTS

| 4,684,558 A | 8/1987 | Keusch et al. |
| 4,997,656 A | 3/1991 | Shikinami et al. |

(Continued)

FOREIGN PATENT DOCUMENTS

| WO | 9947252 | 9/1999 |
| WO | 0217888 | 3/2002 |
| WO | 03035278 A1 | 5/2003 |

OTHER PUBLICATIONS

Adamczyk et al., Immunoassay Reagents for Thyroid Testing 1. Synthesis of Thyroxine Conjugates, Bioconjugate Chem., 5, (1994), 459.

(Continued)

*Primary Examiner* — Trevor Love
(74) *Attorney, Agent, or Firm* — Greenberg Traurig, LLP

(57) ABSTRACT

A film for the retention and controlled release of organic or inorganic molecules consists essentially of a phyllosilicate clay and a organic polyanion. The film may be a built-up layered film of alternating layers of the clay and the polyanion. Organic or inorganic molecules are absorbed into the film from solution, and released in response to changes in the film's environment. The film may be built up using layer-by-layer (LbL) methods, or deposited on a substrate from a mixture of the clay and polyanion. Articles may be coated with the film by the same methods. The film is useful for the controlled release of antibiotics in response to infections, and also retains antibiotics such that bacteria may be killed by direct contact with the film.

8 Claims, 6 Drawing Sheets

(51) Int. Cl.
  *B01J 20/32*  (2006.01)
  *C08K 9/08*   (2006.01)
  *C08K 3/34*   (2006.01)

(56) References Cited

U.S. PATENT DOCUMENTS

| | | |
|---|---|---|
| 5,143,071 A | 9/1992 | Keusch et al. |
| 5,171,264 A | 12/1992 | Merrill |
| 5,219,325 A | 6/1993 | Hennink et al. |
| 5,275,838 A | 1/1994 | Merrill |
| 5,354,790 A | 10/1994 | Keusch et al. |
| 5,480,717 A | 1/1996 | Kundel |
| 5,505,957 A | 4/1996 | D'Angelo et al. |
| 5,538,728 A | 7/1996 | Yanaki |
| 5,567,435 A | 10/1996 | Hubbell et al. |
| 5,593,395 A | 1/1997 | Martz |
| 5,626,863 A | 5/1997 | Hubbell et al. |
| 5,650,165 A | 7/1997 | Akemi et al. |
| 5,674,275 A | 10/1997 | Tang et al. |
| 5,674,346 A | 10/1997 | Kundel |
| 5,700,585 A | 12/1997 | Lee |
| 5,712,346 A | 1/1998 | Lee |
| 5,807,636 A | 9/1998 | Sheu et al. |
| 5,837,377 A | 11/1998 | Sheu et al. |
| 5,840,329 A | 11/1998 | Bai |
| 5,846,214 A | 12/1998 | Makuuchi et al. |
| 6,068,053 A | 5/2000 | Shaw |
| 6,103,785 A | 8/2000 | Kajikawa et al. |
| 6,187,872 B1 | 2/2001 | Yanase et al. |
| 6,228,390 B1 | 5/2001 | Kundel |
| 6,306,922 B1 | 10/2001 | Hubbell et al. |
| 6,316,018 B1 | 11/2001 | Ding et al. |
| 6,444,744 B1 | 9/2002 | Fujimaru et al. |
| 6,468,383 B2 | 10/2002 | Kundel |
| 6,509,098 B1 | 1/2003 | Merrill et al. |
| 6,511,749 B1 | 1/2003 | Mathiowitz et al. |
| 6,740,409 B1 | 5/2004 | Granick et al. |
| 7,045,087 B2 | 5/2006 | Kotov |
| 7,170,119 B2 | 1/2007 | Yamauchi |
| 7,470,449 B2 | 12/2008 | Granick |
| 7,749,957 B2 | 7/2010 | Ittel |
| 7,919,185 B2 | 4/2011 | Chaiko |
| 2001/0041349 A1 | 11/2001 | Patron et al. |
| 2002/0007217 A1 | 1/2002 | Jacob et al. |
| 2002/0010261 A1 | 1/2002 | Callahan et al. |
| 2002/0037383 A1 | 3/2002 | Spillman, Jr. et al. |
| 2002/0071902 A1 | 6/2002 | Ding et al. |
| 2002/0091229 A1 | 7/2002 | Hubbell et al. |
| 2003/0027011 A1 | 2/2003 | Kotov |
| 2003/0031699 A1 | 2/2003 | Van Antwerp |
| 2003/0054024 A1 | 3/2003 | Munro et al. |
| 2003/0069383 A1 | 4/2003 | Van Antwerp et al. |
| 2003/0077447 A1 | 4/2003 | Senak |
| 2003/0082225 A1 | 5/2003 | Mason |
| 2003/0087099 A1 | 5/2003 | Merrill et al. |
| 2004/0013721 A1 | 1/2004 | Antipov et al. |
| 2004/0053037 A1 | 3/2004 | Koch |
| 2004/0137039 A1 | 7/2004 | Sukhishvili |
| 2005/0106207 A1 | 5/2005 | Qiu |
| 2005/0152955 A1* | 7/2005 | Akhave ............... A61L 15/46  424/445 |
| 2005/0163714 A1 | 7/2005 | Sukhishvili et al. |
| 2005/0244439 A1 | 11/2005 | Bringley |
| 2007/0023957 A1 | 2/2007 | Kotov |
| 2007/0191510 A1 | 8/2007 | Chaiko |
| 2007/0254142 A1 | 11/2007 | Collias |
| 2007/0254143 A1 | 11/2007 | Collias |
| 2008/0076832 A1 | 3/2008 | Winters |
| 2008/0131635 A1 | 6/2008 | Ono |
| 2008/0299202 A1 | 12/2008 | Marenzi |
| 2010/0015068 A1 | 1/2010 | Karp |
| 2010/0040653 A1 | 2/2010 | Grah |
| 2010/0239672 A1 | 9/2010 | Kemeny |
| 2012/0134926 A1 | 5/2012 | Lynn |

OTHER PUBLICATIONS

Antipov et al., Polyelectrolyte Multilayer Capsule Permeability Control, Colloids and Surfaces A: Physiochem. Eng. Aspects, 198-200, (2002) 535.

Antipov Vieira, E. et al., Abstract of Patent No. WO2002017888, Controlled and susteined release properties of polyelectrolyte multilayer capsules, (2002).

Antipov, A. et al., Urease-Catalyzed Carbonate Precipitation Inside the Restricted Volume of Polyelectrolyte Capsules, Macromol. Rapid Commun., 24, (2003), 274.

Antipov, A.A. et al., Carbonate Microparticles for Hollow Polyelectrolyte Capsules Fabrication, Colloids Surf. A.: Physiochem. Eng. Aspects, 224, (2003), 175.

Antipov, A.A. et al., Sustained Release Properties of Polyelectrolyte Multilayer Capsule, J. Phys. Chem. B., (2001), 2281.

Bisio, C. et al., Langmuir, 27, pp. 7250-7257, (2011).

Bonderer, L. et al., Bioinspired Design and Assembly of Platelet Reinforced Polymer Films, Science, 319, pp. 1069-1073, (2008).

Boudou, T. et al., Multiple functionalities of polyelectrolyte multilayer films: new biomedical applications, Advanced Materials, 22, pp. 441-467, (2010).

Boulmedais, F. et al., Multilayered Polypeptide Films: Secondary Structures and Effect of Various Stresses, Langmuir, 19, (2003) 9873-9882.

Bourg, I.C. et al., Modeling the acid-base surface chemistry of montmorillonite, Journal of Colloid and Interface Science 312 (2007) 297-310.

Caruso, F. et al., Electrostatic Self-Assembly of Silica Nanoparticle-Polyelectrolyte Multilayers on Polystyrene Latex Particles, J. Am. Chem. Soc., 120, (1998), 8523.

Caruso, F. et al., Enzyme Encapsulation in Layer-by-Layer Engineered Polymer Multilayer Capsules, 16 Langmuir, (2000), 1485.

Caruso, F. et al., Microencapsulation of Uncharged Low Molecular Weight Organic Materials by Polyelectrolyte Multilayer Self-Assembly, 16 Langmuir, (2000), 8932.

Chen, B. et al., Decomposition of poly(ethylene glycol) in Nanocomposites, Journal of Applied Polymer Science, 94, pp. 548-552, (2004).

Chung, A.J. et al., Methods of Loading and Releasing Low Molecular Weight Cationic Molecules in Weak Polyelectrolyte Multilayer Films, Langmuir, 18, (2002) 1176-1183.

Cotton, F. et al., Advanced Inorganic Chemistry, 5th ed., (1988), 90-94.

Decher, G. et al., Buildup of Ultrathin Multilayer Films by a Self-Assembly Process: I. Consecutive Adsorption of Anionic and Cationic Bipolar, 46 Macromol. Symp., (1991) 321.

Decher, G., Fuzzy Nanoassemblies: Toward Layered Polymeric Multicomposites, Science, 277, pp. 1232-1237, (1997).

Dubas, S. et al., Multiple Membranes from "True" Polyelectrolyte-Multilayers; J. Am. Chem. Soc., 123, 22, (2001) 5368-5369.

Dunkerley, E. et al., Effects of Composition, Orientation and Temperature on the O2 Permeability of Model Polymer / Clay Nanocomposites, Macromolecules 43, pp. 10536-10544, (2010).

Fischer, P. et al., Polyelectrolytes Bearing Azobenzenes for the Functionalization of Multilayers, 137 Macromol. Symp., (1999), 1.

Fujiwara, M. et al., Characterization of pH-Dependent Poly(acrylic Acid) Complexation with Phospholipid Vesicles, Journal of Colloid and Interface Science, 185, (1997), 210-216.

Ghosh, S. et al., Role of Clays Structures on the Polybenzimidazole Nanocomposites: Potential Membranes for the Use in Polymer Electrolyte Membrane Fuel Cell, Journal of Physical Chemistry C, pp. 11474-11483, (2011).

Glinel, K. et al., Ordered Polyelectrolyte "Multilayers". 4. Internal Structure of Clay-Based Multilayers, Journal of Physical Chemistry B, 106, pp. 11246-11252, (2002).

Hirsemann, D. et al., Covalent Grafting to μ-Hydroxy-Capped Surfaces? A Kaolinite Case Study, Chemistry of Materials, 23, pp. 3152-3158, (2011).

Hou, S-S et al., Polymer-Clay Nanocomposites from Directly Micellized Polymer/Toluene in Water and Their Characterization by WAXD and Solid-State NMR Spectroscopy, Chemistry of Materials, 15, pp. 1938-1940, (2003).

(56) References Cited

OTHER PUBLICATIONS

International Preliminary Report on Patentability (with International Search Report) issued on Apr. 13, 2006 in connection with International Patent No. PCT/US2004/032491.

Janekovic, A. et al., Preparation of Monodispersed Colloidal Cadmium Compounds, J. Colloid Interface Sci., 103, (1985), 436.

Jang, W. et al., Layer-by-layer assembly of thin film oxygen barrier, Thin Solid Films, 516, (2008), 4819-4825.

Jeon, J. et al., Molecular dynamics simulations of mutilayer films of polyelectrolytes and nanoparticles, Langmuir, 22, (2006), 4629-37.

Kharlampieva, E., et al., Adsorption of a Macromolecule as a Release Trigger of a Small Molecule from Polymer Multilayers, Polymer Preprints, (2003), 671-672.

Kharlampieva, E., et al., Ionization and pH Stability of Multilayers Formed by Self-Assembly of Weak Polyelectrolytes, Langmuir, 19, (2003) 1235-1243.

Kim, D.W. et al., Ordered multilayer Nanocomposites prepared by electrostatic layer-by-layer assembly between aluminosci-licate nanoplatelets and substituted ionic polyacetylenes, Chemistry of Materials, 14, pp. 3925-3929, (2002).

Kim, W. et al., Swelling, Functionalization, and Structural Changes of the Nanoporous Layered Silicates AMH-3 and MCM-22, Langmuir, 27 (12), pp. 7892-7901, (2011).

Kost, J. et al., Responsive Polymeric Delivery Systems, 46 Advanced Drug Delivery Reviews, (2001), 125-148.

Kozlovskaya, V. et al., Hydrogen-Bonded Polymer Capsules Formed by Layer-by-Layer Self-Assembly, Macromolecules, 36, (2003), 8590-8592.

Kozlovskaya, V. et al., Surface priming and the self-assembly of hydrogen-bonded multilayer capsules and films, Macromolecules, 38, (2005), 4828-4836.

Lavalle, P. et al., Direct Evidence for Vertical Diffusion and Exchange Processes of Polyanions and Polycations in Polyelectrolyte Multilayer Films, Macromolecules, 37, (2004), 1159-1162.

Li, J. et al Multidirectional Hierarchical Nanocomposites Made by Carbon Nanotube Growth within Layer-by-Layer-Assembled Films, Chemistry of Materials, 23, pp. 1023-1031 (2011).

Li, Y. et al., Flame retardant behavior of polyelectrolyte-clay thin film assemblies on cotton fabric, ACS Nano, 4, pp. 3325-3337, (2010).

Liu, A. et al., Clay Nanopaper with Tough Cellulose Nanofiber Matrix for Fire Retardancy and Gas Barrier Functions, Biomacromolecules 12, pp. 633-41 (2011).

Liu, N. et al., Photoresponsive Nanocomposite Formed by Self-Assembly of an Azobenzene-Modified Silane, Angewandte Chemie, 42, pp. 1731-1734, (2003).

Liu, X. et al., Chemical composition and surface charge properties of montmorillonite, J.Cent.South Univ. Technol., 15, pp. 193-197, (2008).

Lutkenhaus, J. et al., Anisotropic Structure and Transport in Self-Assembled Layered Polymer-Clay Nanocomposites, Langmuir, 23, pp. 8515-8521, (2007).

Lvov, Y. et al., Formation of ultrathin multilayer and hydrated gel from montmorillonite and linear polycations, Langmuir, 12, (1996), 3038-3044.

Maes, A. et al., Layer Charge-Cation-Exchange Capacity Relationships in Montmorillonite, Clays and Clay Minerals, vol. 27, No. 5, pp. 387-392, (1979).

Neut, D. et al., Antibacterial Efficacy of a New Gentamicin-Coating for Cementless Prostheses Compared to Gentamicin-Loaded Bone Cement, Journal of Orthopaedic Research, 29, (2011), 1654-1661.

Nicol, E. et al., Polyelectrolyte Multilayers as Nanocontainers for Functional Hydrophilic Molecules, Langmuir, 19, (2003), 6178-6186.

Nicotera, I. et al., Effective Improvement of Water-Retention in Nanocomposite Membranes Using Novel Organo-Modified Clays as Fillers for High Temperature PEMFCs, Journal of Physical Chemistry B, 115, pp. 9087-9097, (2011).

Office Action dated Aug. 26, 2008, received in connection with U.S. Appl. No. 10/965,922.

Patil, A.J. et al., Synthesis and Self-Assembly of Organoclay-Wrapped Biomolecules, Angewandte Chemie (International Ed. in English), 43, pp. 4928-4933, (2004).

Pavlukhina, S. et al., Non-eluting Enzymatic Antibiofilm Coatings, ACS Appl. Mater. Interfaces, 4, 9, (2012) 4708-4716.

Pavlukhina, S. et al., Polymer assemblies for controlled delivery of bioactive molecules from surfaces, Adv. Drug Deily. Rev. 63, pp. 822-836 (2011).

Podsiadlo, P. et al., Diffusional Self-Organization in Exponential Layer-By-Layer Films with Micro- and Nanoscale Periodicity, Angewandte Chemie (International Ed. in English) 48, pp. 7073-7077, (2009).

Podsiadlo, P. et al., Layer-by Layer Assembly of Nacre-like Nanostructured Composited with Antimicrobial Properties, Langmuir, 21, (2005), 11915-11921.

Podsiadlo, P. et al., Ultrastrong and Stiff Layered Polymer Nanocomposites, Science, 318, pp. 80-83, (2007).

Priolo, M. et al., Transparent clay—polymer nano brick wall assemblies with tailorable oxygen barrier, ACS Applied Materials & Interfaces, 2, (2010), 312-320.

Priolo, M.A. et al., Super gas barrier of transparent polymer—clay multilayer ultrathin films, Nano Letters, 10 (12), pp. 4970-4974, (2010).

Qiu, X. et al., Permeability of Ibuprofen in Various Polyelectrolyte Multilayers, 286 Mater. Eng., (2001), 591.

Ras, R.H.A. et al., Ultrathin hybrid films of clay minerals, Physical Chemistry Chemical Physics, 9, pp. 918-932, (2007).

Sastry, N.V. et al., Adsorption of Polyacrylic Acid and Sodium Dodecylbenzenesulfonate on Kaolinite, Journal of Colloid and Interface Science, 171, pp. 224-233, (1995).

Schlenoff, J.B. et al., Sprayed Polyelectrolyte Multilayers, Langmuir, 16, (2000), 9968.

Serizawa, T. et al., Thermoresponsive Ultrathin Hydrogels Prepared by Sequential Chemical Reactions, Macromolecules, 35, (2002) 2184.

Shchukin et al., Micron-Scale Hollow Polyelectrolyte Capsules with Nanosized Magnetic Fe3O4 Inside, Materials Letters, 57, (2003), 1743.

Shi et al., Release Behavior of Thin-Walled Microcapsules Composed of Polyelectrolyte Multilayers, Langmuir, (2001), 2036.

Simhadri, J.J. et al., Role of Nanocomposite Hydrogel Morphology in the Electrophoretic Separation of Biomolecules: A Review, Ind. Eng. Chem. Res., pp. 11866-11877, (2010).

Smith, S.M., D-lactic acid production as a monitor of the effectiveness of antimicrobial agents, Antimicrobial Agents and Chemotherapy, 35, (1991), 237-241.

Soike, T. et al., Engineering a Material Surface for Drug Delivery and Imaging using Layer-by-Layer Assembly of Functionalized Nanoparticles, Advanced Materials 22, pp. 1392-1397, (2010).

Soppimath, K.S. et al., Multifunctional Core/Shell Nanoparticles Self-Assembled from pH-Induced Thermosensitive Polymers for Targeted Intracellular Anticancer Drug Delivery, Advanced Functional Materials, 17, pp. 355-362, (2007).

Specification of U.S. Defensive Publication No. T099082, filed Nov. 15, 2000.

Stuart, M.A.C. et al., Emerging applications of stimuli-responsive polymer materials, Nature Materials, 9, pp. 101-113 (2010).

Sukhishvili, S. et al., Layered, Erasable, Ultrathin Polymer Films, J. Am. Chem. Soc., 122, (2000) 9550-9551.

Sukhishvili, S., Layered, Erasable Polymer Multilayers Formed by Hydrogen-Bonded Sequential Self-Assembly, Macromolecules, 35, (2002), 301-310.

Sukhorukov, G.B. et al., Layer-by-Layer Self Assembly of Polyelectrolytes on Colloidal Particles, 137 Colloids Surf. A: Physiochem. Eng. Aspects, (1998), 253.

Sukhorukov, G.B. et al., Microencapsulation by Means of Step-Wise Adsorption of Polyelectrolytes, J. Microencapsulation, 17, (2000), 177.

Sukhorukov, G.B. et al., pH Controlled Macromolecule Encapsulation in and Release from Polyelectrolyte Multilayer Nanocapsules, 22 Macromol. Rapid. Commun., (2001), 44.

(56) References Cited

OTHER PUBLICATIONS

Sukhorukov, G.B. et al., Stepwise Polyelectrolyte Assembly on Particle Surfaces: a Novel Approach to Colloid Design., 9 Polym. Adv. Technol., (1998), 759.

Szabo, T. et al., Layer-by-layer construction of ultrathin hybrid films with proteins and clay minerals, Journal of Physical Chemistry C, 111, pp. 12730-12740, (2007).

Tang, Z. et al., Nanostructured artificial nacre, Nature Materials, 2, pp. 413-418 (2003).

Tombacz, E. et al., Surface charge heterogeneity of kaolinite in aqueous suspension in comparison with montmorillonite, Applied Clay Science, 34, 105-124, (2006).

Tran, N. et al., Interactions of sodium montmorrilonite with poly(acrylic acid), Journal of Colloid and Interface Science, 290, pp. 392-396, (2005).

Utracki, L.A. et al., Synthetic, layered nanoparticles for polymeric nanocomposites (PNCs), Polymers for Advanced Technologies, pp. 1-37, (2007).

Van Duffel, B. et al., Multilayered clay films: atomic force microscopy study and modeling, Langmuir, 15, (1999), 7520-7529.

Vidal, L. et al., Efficacy and safety of aminoglycoside monotherapy: systematic review and meta-analysis of randomized controlled trials, Journal of Antimicrobial Chemotherapy, 60, (2007), 247-257.

Williams, L.B. et al., What makes a natural clay antibacterial?, Environmental Science and Technology, 45, pp. 3768-3773, (2011).

Yang, Y-H. et al., Influence of Deposition time on Layer-by-Layer Growth of Clay-Based Thin Films, Ind. Eng. Chem. Res. (2010) 8501-8509.

Yang. S.Y. et al., Bio-inert Solution-cross-linked Hydrogen-bonded Multilayers on Colloidal Particles, Langmuir, 20, (2004), 5978-5981.

Zhao, H. et al., Probing Surface Charge Potentials of Clay Basal Planes and Edges by Direct Force Measurements, Langmuir, 24, pp. 12899-12910, (2008).

Zhuk, A. et al., Multiresponsive clay-containing layer-by-layer films, ACS Nano, 5, (2011), 8790-8799.

\* cited by examiner

CLAY-CONTAINING THIN FILMS AS CARRIERS OF ABSORBED MOLECULES

STATEMENT REGARDING FEDERALLY SPONSORED RESEARCH

The development of the technology disclosed herein was supported in part by funds from the U.S. government (NSF Grant #CBET-0708379) and the U.S. government may therefore have certain rights in the disclosed technology.

FIELD OF THE INVENTION

The present invention relates generally to coatings which host and retain organic or inorganic molecules and release a portion of same upon environmental changes, more specifically to such coatings which comprise different materials, such as organic polymers and clays.

BACKGROUND OF THE INVENTION

Hybrid organic-inorganic nanocomposites of polymers and clay platelets represent a type of advanced material with promising applications in biosensing and catalysis, as well as in the fuel cell and pharmaceutical industries, including applications involving the controlled release of drugs. These materials also have superior gas barrier functions and are useful as fire retardants.

Clay is an inexpensive material that is chemically and thermally stable. Clay nanosheets interact with synthetic polymers, organic cations, amino acids and proteins. Because of the high aspect ratio and high surface-to-volume ratios of clay nanosheets, the addition of small amounts (e.g., less than about 10% by weight) of a clay such as montmorillonite to polymer materials significantly improves the mechanical and thermal properties of the resulting nanocomposites. Positively-charged polymers and/or cationic surfactants can adsorb at the silicate surfaces of the clay via electrostatic interactions with negative charges at the clay basal plane. Moreover, organo-modified clays are broadly used in the preparation of nanocomposites, allowing introduction of specific functionalities into the nanocomposite materials via an appropriate selection of molecules adsorbed to the clay. Recently, attention has been attracted by advanced functional stimuli-responsive materials constructed from organic and inorganic components, in response to a growing demand to deliver certain molecules at specific conditions when and where their activities are desired.

Often, delivery of functional molecules may be realized in the vicinity of modified surfaces, such as a surface of a biomedical device or a scaffold. The layer-by-layer (LbL) technique is a powerful tool of surface modification enabling construction of multifunctional thin-film surface coatings. The technique is based on sequential adsorption of oppositely-charged or hydrogen-bonded molecules at a substrate surface, and allows control of the thickness, structure and properties of the coatings. The LbL technique allows the use of aqueous solutions, which is environmentally attractive and enables incorporation of charged and chargeable molecules within LbL films. Moreover, multilayer films can be fabricated on substrates of different shapes. The potential of polyelectrolyte multilayers for biomedical applications has been discussed in recent reviews.

One useful constituent of LbL films is the clay nanosheet or platelet. In prior art embodiments of LbL films, positively-charged polymers are paired with negatively-charged polymers, or negatively-charged clay platelets are paired with positively-charged polymers. The clay and polymers bond to each other through electrostatic interactions. Another reported scenario is binding of negatively-charged clay platelets with neutral polymers (i.e., polymers having no charges at any pH) through hydrogen bonding. For example, U.S. Published Patent Application No. 2004/0053037 discloses construction of LbL barrier films containing negatively-charged inorganic materials and organic materials comprising cationic polyelectrolytes or hydrogen bonding neutral polymers (e.g., a homopolymer of acrylamide or a polyvinyl alcohol copolymer).

Clay-containing LbL films are known for their high mechanical strength, as well as for their antiflammability and oxygen barrier properties. For example, U.S. Pat. No. 7,045,087 describes LbL clay-containing films having sufficient mechanical stability to be free-standing. Such films were assembled by combining layers of positively-charged polymers and negatively-charged clay platelets.

It is also known that clay-containing LbL films perform well as gas, flavor and aroma barriers. In other applications, the inclusion of electrochemically active corrosion inhibitors, render LbL organic-inorganic assemblies useful for corrosion protection of metal surfaces. U.S. Published Patent Application No. 2003/0027011 describes the preparation of clay-containing films by alternating layers of poly(dimethyldiallylammonium chloride) (PDDA, which is a positively-charged polymer), and clay, as well as films prepared from layers of PDDA, poly(acrylic acid) (PAA) and clay, wherein the PAA and clay layers were alternated as the negatively-charged species.

The majority of clay-containing films are designed for use in the dry state. While the use of clay films as diffusion barriers in water have been reported (see, A. Zhuk et al., ACS Nano 5 (2011) 8790-9, which is incorporated by reference herein). However, such films were not two-component clay-polyanion films.

SUMMARY OF THE INVENTION

In one aspect, the present invention includes films for the retention and controlled release of organic and inorganic molecules. In some embodiments, such films consist essentially of platelets of phyllosilicate clay and an organic polyanion. In some such embodiments, the films are layered films including alternating layers of phyllosilicate clays and organic polyanions. In some embodiments, the film carries organic or inorganic molecules absorbed within it.

In another aspect, the present invention includes methods for making films for the retention and controlled release of organic and inorganic molecules. In some embodiments, the film is deposited on a surface from a mixed solution or dispersion of platelets of phyllosilicate clay and organic polyanions. In other embodiments, the film is assembled using a layer-by-layer (LbL) method to form alternating layers of phyllosilicate clay and organic polyanions. In some such embodiments, the film is immersed in a solution of organic or inorganic molecules for a time sufficient to allow the molecules to become absorbed into the film.

In yet another aspect, the present invention includes an article with a film consisting essentially of a phyllosilicate clay and an organic polyanion adhering to it. In some embodiments, the film is a layered film including alternating layers of platelets of phyllosilicate clays and organic polyanions. In some embodiments, the film carries organic or inorganic molecules absorbed within it.

BRIEF DESCRIPTION OF FIGURES

For a better understanding of the present invention, reference is made to the following detailed description of exemplary embodiments considered in conjunction with the accompanying drawings, in which.

DETAILED DESCRIPTION OF THE INVENTION

Figure 1:
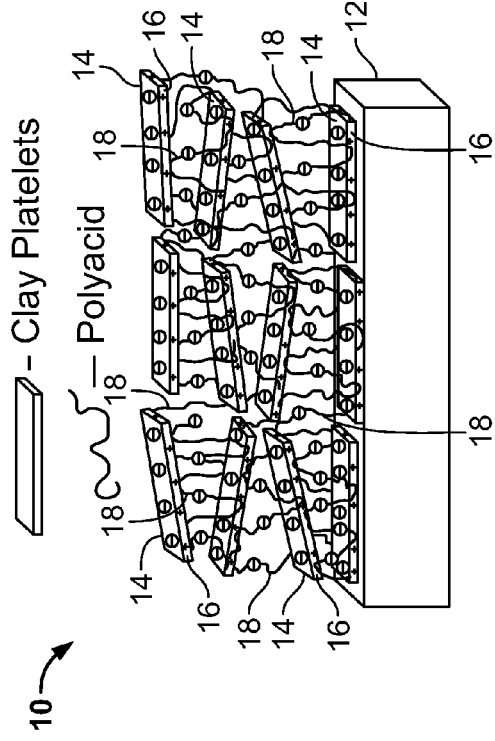
FIG. 1 is a schematic representation of a layered film according to an embodiment of the invention.

In the exemplary embodiments of the invention discussed herein, the clays used in the films are phyllosilicates (e.g., montmorillonite). Phyllosilicates have heterogeneous charge distributions, and often carry positive charges at their edges at neutral and acidic pH values despite having a net negative charge. At low pH, edges of the clay platelets interact with polycarboxylic acid groups, probably due to a combination of electrostatic interactions, hydrogen bonding, and chemisorption. These interactions can be used to construct clay-polyanion surface films, and would not necessarily be limited to the use of polycarboxylic acids. FIG. 1 is a schematic representation of a film 10 according to an embodiment of the present invention adhering to a substrate 12. The film 10 essentially consists of layers of negatively-charged clay platelets, such as platelets 14, having positive charges at their edges, such as edges 16, and negatively-charged polyanions, such as polyanions 18. Surprisingly, such films are stable at neutral and slightly basic pH values (pH 7.5, 0.15-0.2M NaCl), when the overall charge of both the clay platelets 14 and the polyanions 18 is negative.

Figure 2:
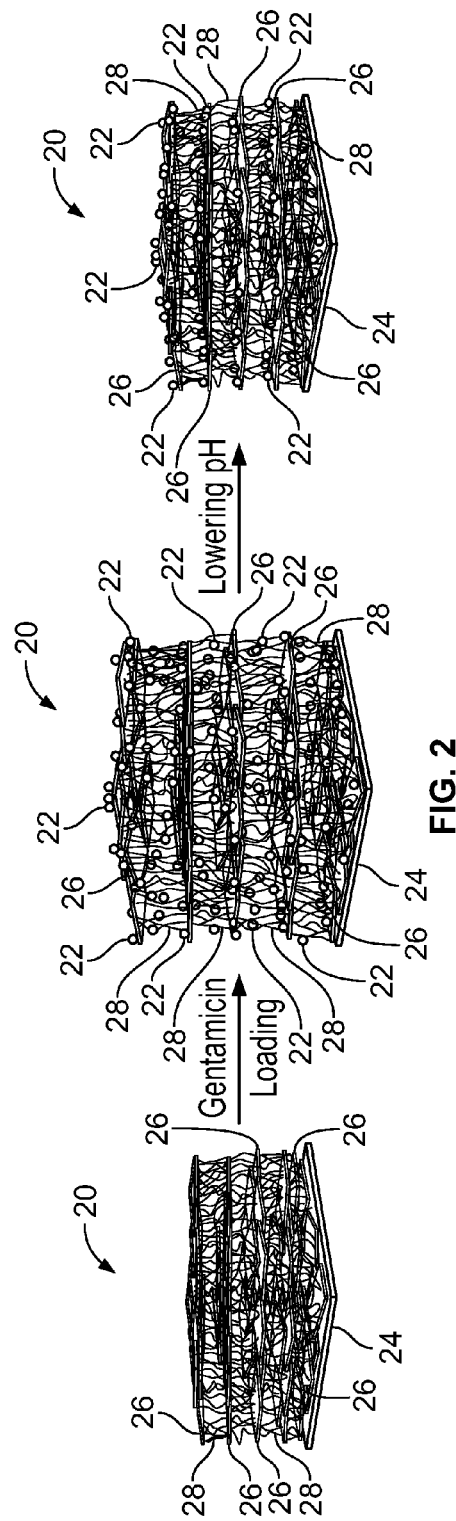
FIG. 2 is a schematic representation of a layered film according to an embodiment of the invention and its response to loading with organic molecules and changes in pH.

The films of the present invention are highly swollen in aqueous environments, and function as high-capacity matrices for loading positively-charged or neutral organic or inorganic molecules (e.g., antibiotics and other biologically-active molecules) within the film. FIG. 2 is a schematic representation of a film 20 of the same type as film 10 of FIG. 1, illustrating the response of the film 20 to loading with absorbed molecules, such as molecules 22 which are illustrated by small circles, and by changes in pH. Throughout the rest of this disclosure, small circles in the schematic illustrations of films represent molecules which are absorbed into the film, such as small molecules 22, layers such as layers 26 represent clay layers, and layers such as layers 28 represent layers of polyanions.

Continuing to refer to FIG. 2, the film 20 adheres to a substrate 24 and consists of layers 26 of clay and layers 28 of polyanions. The small molecules 22 are believed to be retained within the film 20 largely due to their electrostatic attraction to permanent negative charges at the basal plane of clay layers 26 and pH-dependent negative charges in the polyanion layers 28.

Films according to the present invention include, but are not necessarily limited to, any films comprising a weak polyanion (e.g., weak polycarboxylic acids) and clay. Clay platelets (also referred to herein as "nanosheets") that are useful with this invention include, but are not necessarily limited to natural 2:1 and 1:1 phyllosilicates, such as montmorillonite, mica and kaolinite, as well as synthetic clays. The films of the present invention can be made on substrates by deposition of polyanions and clay from mixtures thereof, or sequentially using LbL techniques to deposit alternating layers of clay and polyanions. Examples of such techniques include immersion, spin coating or spraying. The absence of requirements for clay modification in many embodiments of the present invention eases the commercialization of the processes used to form the films.

Embodiments of the films of the present invention are stable over a wide range of pH and ionic strengths, including physiological conditions, as well as in organic solutions such as ethanol. Some such embodiments also have a high loading capacity for molecules that are positively-charged at the loading conditions. These features make such embodiments of the present invention attractive candidates for storage of bioactive molecules that are positively-charged at the loading conditions. Examples of guest molecules suitable for loading within clay-containing films of the present invention include antibacterial agents, such as peptides, peptoids, proteins, antibiotics, as well as other bioactive molecules.

Polymer-clay matrices according to embodiments of the present invention include, but are not necessarily limited to, any composite film formed of a weak polyanion and a clay. Organic and inorganic molecules that may be absorbed into such polymer-clay matrices for long-term retention and subsequent controlled release are referred to hereinafter as "guest molecules." Guest molecules that are useful in the present invention typically have positive charges or readily acquire positive charges under physiological conditions, and include: (i) antibiotics, such as amikacin, ampicillin, cephaloridine, gentamicin, ethionamide, protonsil, sisimicin, sulfanilamide and its derivatives, and polymycin B; (ii) anti-infective agents, such as chlorazanil, aminophenazole, trimethoprim, pyrimethamine, primaquine and sontoquine; (iii) anti-inflammatory agents, such as glaphenine; (iv) anesthetics, such as benzocaine, procaine and piridocaine; (iv) anticancer drugs, such as doxorubicin; (v) hormones; (vi) neurotransmitters and humoral factors, such as amphetamine and meparfynol; (vii) antidepressants and tranquilizers, such as phenelzine, pheniprazine, etryptamine, methpimazine and pipamazine; (viii) antispasmodic agents, such as methantheline bromide and fenethylline; (ix) antihypertensive agents, such as dihydralazine and bretylium tosylaye; (x) hypotensive agents, such as minoxidil; (xi) anesthetics and central nervous system stimulants, such as neostigmine, ephedrine, oxyfedrine, levonordefrine, tranylcypromine, fencamfine; (xii) antidiabetic agents, such as phenformin; (xiii) analgetics, such as phenazopyridine; (xiv) obesity control agents, such as phentermine and chlorphentermine; (xv) diuretic agents, such as chlorazanil, aminotetradine, amiloride and amisotetradine; (xvi) anticoccidial drugs, such as amprolium; (xvii) anthelmintic agents, such as dithiazinine; (xvii) proteins, peptides and peptoids; and (xviii) metal ions such as silver ($Ag^+$). Many such compounds are challenging to incorporate within an all-polymer film because they may readily leach out. Films according to embodiments of the present invention might also absorb and retain non-positively-charged. or neutral, antibiotics, such as vancomycin, teicoplanin, triclosan, and nitrofurazone, which may be deposited from an ethanol solution.

The combinations of clay and polyanions that are useful in embodiments of the present invention are surprising and unexpected. Such constituents would not usually be expected to bind to each other within a film. Typically, a positively-charged constituent is introduced between a clay and a polyanion to stabilize the film. For example, U.S. Published Patent Application No. 2003/0027011 provides a polycation between clay and PAA layers to achieve a stable LbL film construction.

In the exemplary embodiments of the present invention discussed herein, gentamicin was chosen as an example of a small bioactive molecule. Gentamicin is an antibacterial drug of the aminoglycoside class, which is widely used due to its broad-spectrum antibacterial activity. In bacterial experiments discussed herein, clay/polyacid films demonstrated a dual function: a pH-stimulated release of the loaded antibiotic supported by the weak-polyelectrolyte nature of a polycarboxylic acid, and contact killing of bacteria enabled by retention of gentamicin within the films as a result of interactions between negatively-charged clay nanosheets with the positively-charged antibiotic. The ionization state of the carboxylic groups of the polycarboxylic acid changes as a function of pH, rendering the film pH-sensitive. This pH-sensitivity can be used to deliver small biologically-active molecules on demand (e.g., in response to local decreases in pH caused by bacterial infection, inflammation, or cancer). In many types of bacterial infection, the pH value of the surrounding physiologic fluid decreases as a result of production of lactic acid by the proliferating bacteria. At the same time, clay nanosheets were found to strongly retain gentamicin under varied pH conditions, supporting the long-term antibacterial function of the film.

The Examples presented herein demonstrate that LbL assembly is an effective method for constructing clay/polymer thin films with controlled retention and pH-stimulated release of antibiotics. A combination of the dual mechanisms of antibacterial activity (i.e., killing by contact with the loaded film and pH-triggered release of the antibiotic) with the ability of such films to function in solutions having high ionic strength makes the films of the present invention promising candidates for applications in biomedical technologies and implantable devices.

The films can be formed on surfaces of monolithic solids, porous or fibrous materials, or particles. Examples of suitable monolithic solids include semiconductors such as silicon or germanium, titanium implants, or articles made of polymers such as silicone, Teflon®, polyethylene, polypropylene, polyethylene terephthalate, and others. Fibrous materials include natural or synthetic fabrics, such as cotton, silk, viscose, or nylon. Porous materials include Dacron® and others. As demonstrated in the Examples below, positively-charged molecules are absorbed into polymer-clay films after the film is produced.

Exemplary films according to embodiments of the present invention are disclosed herein. These disclosures are non-limiting and other composite clay-containing thin films as well as similar structures and compositions having characteristics similar to the films disclosed herein, would be recognized as being within the scope of the present invention by one having ordinary skill in the art and possession of the present disclosure. Similarly, one having ordinary skill in the art and possession of the present disclosure made herein would recognize methods for implementing the present invention that are not necessarily disclosed herein.

EXAMPLE 1

In exemplary embodiments of the invention disclosed herein, a multilayer nanocomposite of montmorillonite clay and poly(acrylic acid) (PAA) was built up by LbL deposition or by adsorption from clay-PAA mixtures. The general procedure for LbL film formation described in the present Example was also used in Examples 2-8, 10, and 11.

For film deposition, silicon wafers were pre-cleaned under a quartz UV lamp for at least 2 hours, soaked in concentrated sulfuric acid for 1 hour, and then carefully rinsed with Type 1 ultrapure water, such as that produced by the Milli-Q® water treatment system (EMD Millipore, Billerica, Mass.). Then, the silicon wafers were dried under a flow of nitrogen. To enhance the attachment of multilayers to the silica surface, a layer of branched poly(ethylenimine) (BPEI) was deposited onto the wafers as a precursor layer. BPEI was allowed to adsorb to the surfaces of the wafers from 0.2 mg/mL polymer solutions in 0.01 M phosphate buffer at pH 5. This deposition step was followed by rinsing the pre-coated wafer with a buffer solution at the same pH value.

Clay/PAA multilayers were prepared at the surfaces of the precursor-coated substrates using 0.2 mg/mL solutions of PAA in water at pH 2.2 to form PAA layers and dispersions of about 0.4-0.5 mg/mL of montmorillonite in water at pH 2.2 to form clay layers. Stock solutions of clay (5 g/L) were prepared at least one month in advance of their date of use. A clay-water suspension diluted 10-fold from stock was dispersed by overnight sonication. PAA and clay were allowed to adsorb for 6 min. to form each layer of the respective materials. After each deposition, the coated wafer was rinsed with water at pH 2.2. PAA and clay layers were deposited alternately to provide the desired number of layers, with clay as the topmost layer.

Successful film depositions and the thicknesses of the films were confirmed using atomic force microscopy (AFM). AFM measurements were performed in air at room temperature using a NSCRIPTOR™ dip pen nanolithography system (Nanoink, Skokie, Ill.) operating in AC (contact) mode.

Figure 3:
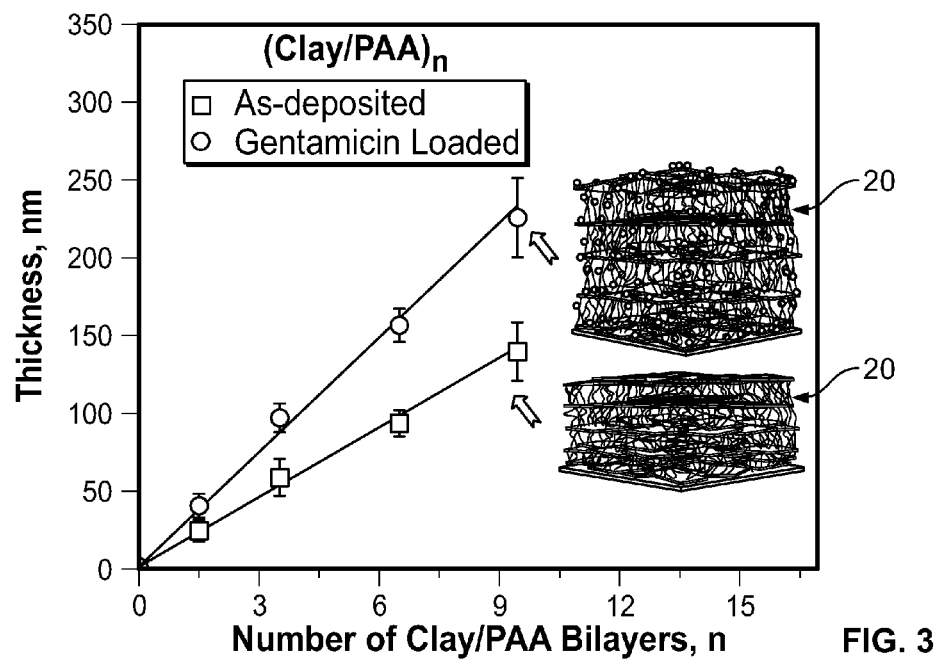
FIG. 3 is a plot of the thickness of unloaded and loaded dry films according to embodiments of the present invention as a function of the number of layers in the films and the loaded and unloaded states, with inset schematic representations of the dry films.

FIG. 3 presents plots of the thickness of dry films similar to film 20 of FIG. 2 as a function of the number of bilayers in the films. Separate plots are provided for the film 20 in a gentamicin-loaded state (plotted as circles) and an unloaded, "as-deposited" state (plotted as squares). Both plots demonstrate linear growth of the dry film thickness with increasing numbers of clay/PAA bilayers. The linear growth regime reflects low diffusivity of PAA ($M_n$=450 K) and clay platelets (about 1 nm thick with an aspect ratio of about 200) during deposition. On the other hand, the bilayer thickness for the clay/PAA system is much larger (around 15 nm per clay/PAA bilayer) compared to that known for other clay/polymer systems, where the typical bilayer thicknesses range from about 1.6 nm for BPEI/laponite multilayers to 5.4 nm for BPEI/laponite/PEO films. Differential thickness measurements by AFM and ellipsometry also revealed an increase of 11±1 nm of thickness per clay layer, compared with an increase of 4±1 nm for the single PAA layers. The thickness value for the clay layer is significantly greater than the platelet thickness and suggests absorption of more than single layer of clay nanosheets in single deposition cycles. Also, multilayer growth may include random tiling of the negatively-charged clay platelets onto a flexible layer of organic polyelectrolytes. Successful growth of clay/PAA films was also confirmed in experiments where films were deposited at the surface of 4-μm-diameter silica particles.

In earlier work (see, e.g., Wilson et al., Journal of Colloid and Interface Science 290 (2005) 392-396, which is incorporated by reference herein), interaction of PAA with smectite clay montmorillonite in aqueous bulk solutions at low pH (pH<2) was evidenced by expansion of the basal planar spacing of the clay (d001) in X-ray diffraction. Examination of clay/PAA LbL films deposited at the surface of silicon wafers according to embodiments of the present invention indicate that clay-PAA interactions can be controlled by solution pH, and that clay-PAA binding does not occur at pH higher than 4.0 (data not shown).

Without being bound by theory, the results described above may be explained by pH-dependent variations of charge at the clay platelet edges. Positively-charged platelet edges may dominate at low pH, and negative edges may prevail at high pH. Binding between clay and PAA did not occur at pH higher than 4.0 because this pH value is close to the $pK_a$ of $AlOH_2^+$ (about pH 5). Therefore, the density of positive charges at platelet edges at pH>4 becomes insufficient to assure binding with negatively-charged units of PAA. Furthermore, it is possible that assembly of PAA ($pK_a$ of about 4.5) with clay at pH 2.2 is also driven by dipole-cation interactions between the carbonyl (C=O) group of PAA and clay edges with positive charges. However, when deposited at pH 2.2, (clay/PAA)$_n$ films (where n is the number of deposited bilayers) were stable for at least a month over a pH range from 2 to 8 supported by 0.01 M phosphate buffer with additional 0.2 M NaCl. At pH>8, AlOH and SiOH edge groups acquire negative charge ($pK_a$ of AlOH and SiOH of about 7.9-8.5), and negatively-charged faces and edges of clay platelets repel negatively-charged carboxylic groups of PAA, resulting in film destruction. In other words, it is possible that while the pH window for deposition of clay/PAA films is controlled by the $pK_a$ of $AlOH_2^+$ at the edges, and that the stability of the multilayers correlates with the $pK_a$ of AlOH and SiOH groups.

EXAMPLE 2

Referring back to FIG. 3, gentamicin was loaded within a film 20 to demonstrate the use of clay/PAA films 20 for controlled drug delivery according to an embodiment of the present invention. To load the gentamicin, clay/PAA films were exposed to gentamicin solutions (0.2 mg/mL in 0.01 M phosphate buffer at pH 7.5 in the presence of 0.2 M NaCl) for 2 hours to achieve maximum absorption of the gentamicin within the films 20. The loading capacity of clay/PAA films 20 having different numbers of deposited layers was studied by taking AFM measurements of the loaded films, which indicates a 0.5:1 (mass/mass) loading rate of gentamicin into the film 20.

Figure 4:
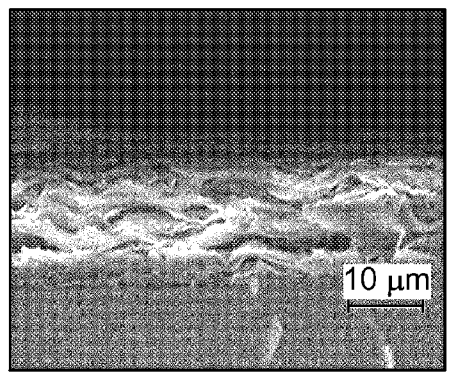
FIG. 4 is a scanning electron microscopy (SEM) image of a cross-section of a film according to an embodiment of the present invention as synthesized.
Figure 5:
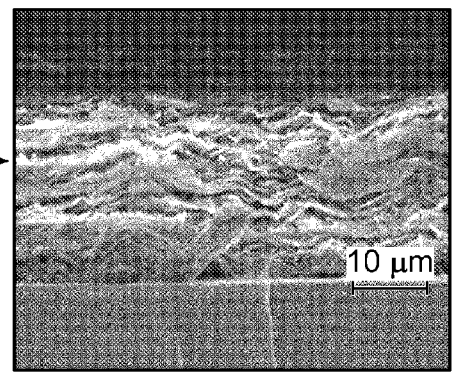
FIG. 5 is a SEM image of a cross-section of a film according to the embodiment of FIG. 4 after the film has been loaded with organic molecules.
Figure 6:
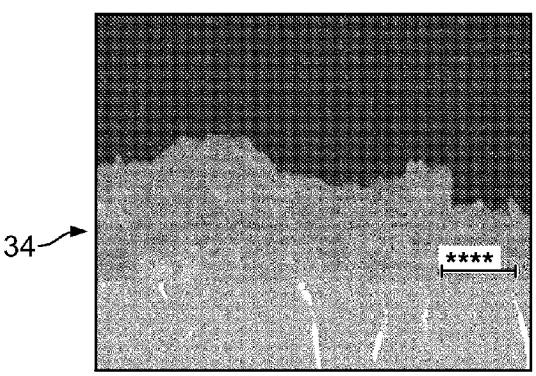
FIG. 6 is a SEM of a cross-section of a film consisting of layers of clay and organic molecules for comparison with FIGS. 4 and 5.

FIGS. 4, 5, and 6 are scanning electron microscopy (SEM) images of cross-sections of film 30 (FIG. 4) and film 32 (FIG. 5), both of which are of the same type as film 20 of FIGS. 2 and 3, and film 34 (FIG. 6), which is of a different type. Films 30 and 32 are (clay/PAA)$_{90.5}$ films (i.e., films having 90.5 bilayers) before (FIG. 4) and after (FIG. 5) loading of gentamicin into the film. The SEM images were obtained using Scanning Electron Microscope Auriga™ (Carl Zeiss Microscopy GmbH, Jena, Germany). Silicon wafers were glued to the SEM stage by conductive tape. Au—Pt alloy was sputtered onto the sample surfaces within a RF-plasma chamber for 10 seconds. The applied voltage was varied from 1 to 3 kV. Consistent with earlier reports of the preferred orientation of clay nanosheets parallel to the film surfaces, the corresponding cross-sectional SEM images in FIGS. 4 and 5 confirm the layered structures of the films 30, 32. Within such films, the high surface area and high aspect ratio of clay platelets restricts layer intermixing. Furthermore, FIG. 5 clearly illustrates thickening of the film 32 caused by loading of gentamicin within the clay/PAA film. The initial thickness of the film 32 cross-section increases from about 1.1 μm prior to loading (FIG. 4) to about 1.6 μm (about 1.5 times) after gentamicin loading (FIG. 5). Referring to FIG. 6, film 34 was formed by LbL deposition of 90.5 bilayers of clay and gentamicin. Unlike (clay/PAN)$_n$ films, (clay/gentamicin)$_{90.5}$ films were rough, with a poor degree of clay layering.

EXAMPLE 3

The swelling behavior of clay/PAA films was studied by confocal laser scanning microscopy (CLSM) of (clay/PAA)$_{150.5}$ films. CLSM imaging of films was performed using a Zeiss LSM 5 PASCAL confocal scanning system (Carl Zeiss MicroImaging, Inc., Jena, Germany) equipped with a C-Apochromat 63/1.2 W Corr water immersion objective. For film visualization, the multilayered films were immersed into Alexa-488 solution (Life Technologies Corporation, Grand Island, N.Y.). For CLSM studies, the hydrogel film on the silicon wafer was vertically placed in Lab-Tek chambered cells (Thermo Scientific Nunc, Waltham, Mass.). The chambers of the Lab-Tek coverglass were then sequentially filled with buffer solutions at a certain pH.

Figure 7:
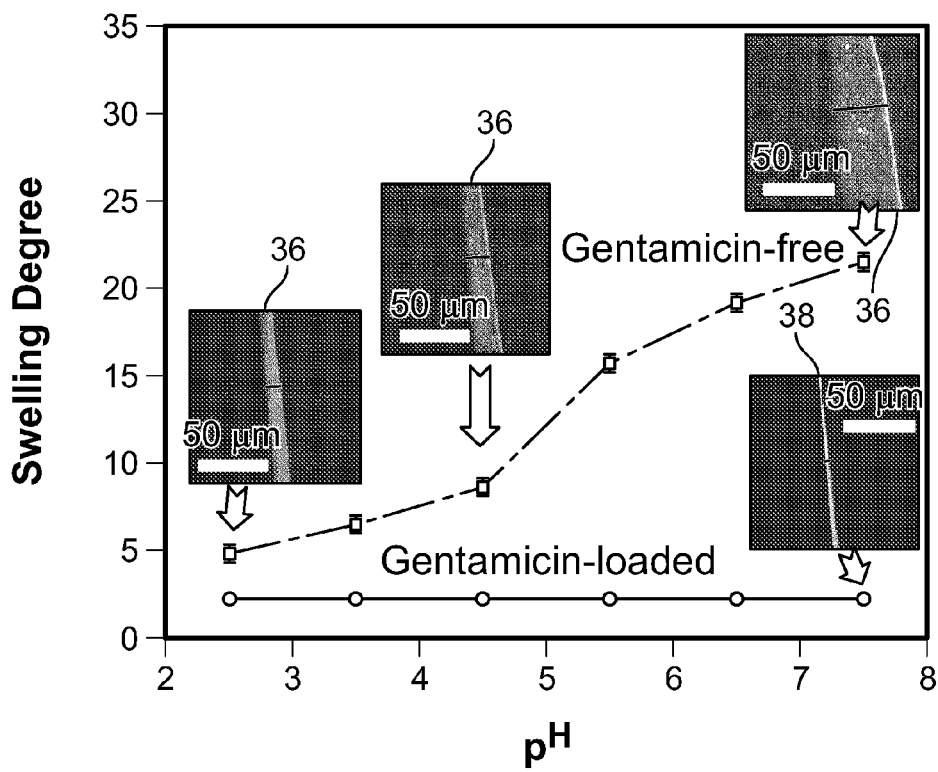
FIG. 7 is a plot of a swelling profile of an as-synthesized film according to an embodiment of the present invention and a swelling profile of a loaded film according to another embodiment of the present invention, with inset microphotographs illustrating the films at various degrees of swelling.
Figure 8:
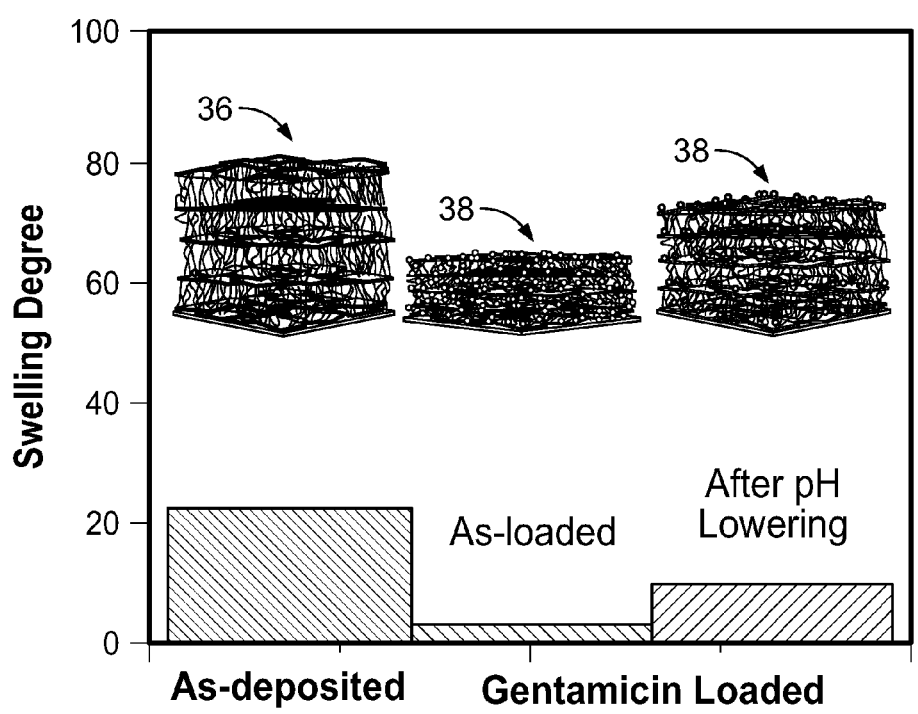
FIG. 8 is a bar chart illustrating the degree of swelling of films according to an embodiment of the present invention in an unloaded, as-synthesized state, after loading with organic molecules, and after pH adjustment, with inset schematic drawings of the film in the aforesaid states.

FIG. 7 presents plots of swelling profiles of as-synthesized (clay/PAA)$_{150.5}$ films 36 and a (clay/PAA)$_{150.5}$ film 38 loaded with gentamicin. FIG. 8 is a bar chart illustrating the degree of swelling the film 36, film 38 after loading with small molecules, and film 38 after pH adjustment. As seen in FIGS. 7 and 8, the films 36 show very high swelling degrees in aqueous solutions. The degree of swelling of the films 36 strongly increased in the pH range from 2.5 to 7.5, as PAA became more ionized, resulting in electrostatic and osmotic swelling of the films 36. As measured by CLSM, the degree of swelling changed from 4 at pH 2.5 to 20 at pH 7.5. Such a high degree of swelling is advantageous for the use of these films as matrices for loading of bioactive molecules. Continuing to refer to FIGS. 7 and 8, the swelling behavior of the gentamicin-loaded (clay/PAA)$_{150.5}$ films 38 provided additional evidence of a charge compensation mechanism for antibiotic loading. The gentamicin-loaded films 38 swelled to a much smaller degree (i.e., only about 2 times the dry film thickness in solutions at pH 7.5) This fact can be explained theoretically by neutralization of the negative charges of PAA by positively-charged molecules of gentamicin. The loaded film 38 did not show any changes in swelling while soaked in water at pH 6.5; 5.5; 4.5; 3.5; 2.5 for 30 min at each pH value. However, when loaded films 38 were then exposed to pH 7.5, the degree of swelling increased to about 9 (FIG. 8) This behavior is consistent with partial release of gentamicin from the clay/PAA film 38 as a result of decreasing solution pH. It may be noted that the swelling of a (clay/gentamicin)$_{150.5}$ film observed with confocal microscopy was pH-independent, and the swelling degree was much lower (i.e. a factor of about 2). Therefore, it can be reasonably concluded that the degree of film swelling is controlled by charge neutralization and the consequent swelling of "soft" layers of PAA.

EXAMPLE 4

Figure 9:
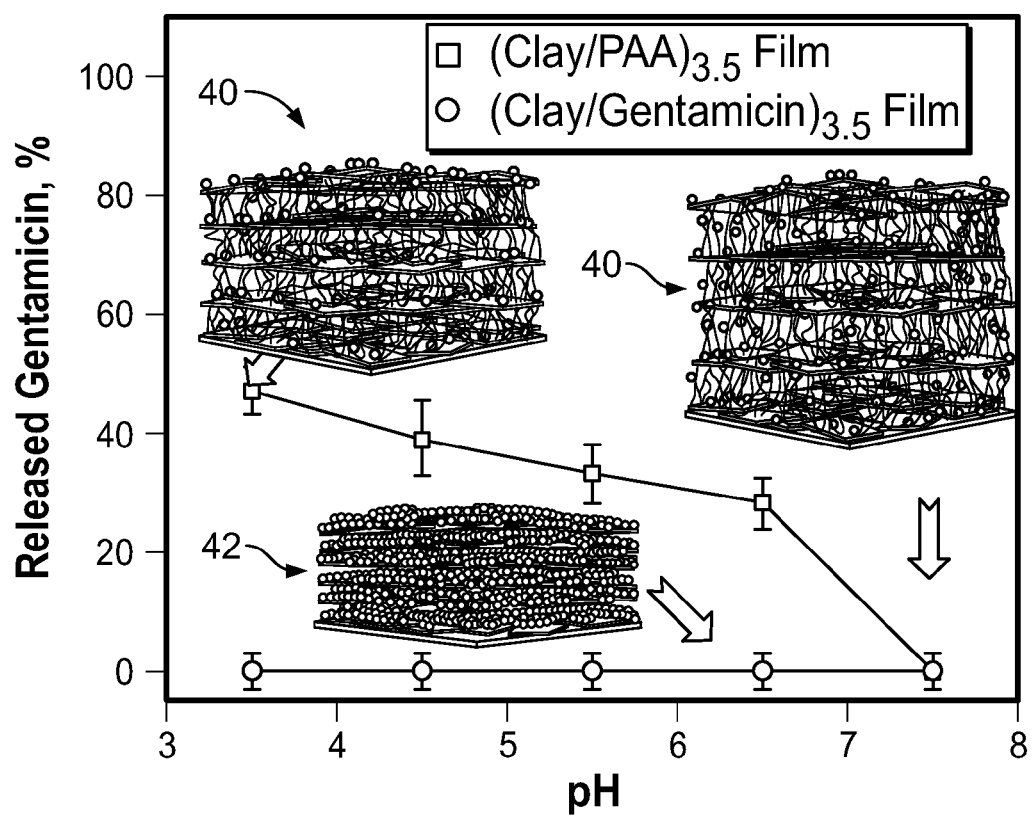
FIG. 9 is a plot of a pH-triggered release of molecules from a loaded film according to the present invention and from another film composed of layers of clay and antibiotic molecules, with inset schematic drawings of the two films.

FIG. 9 presents plots of a pH-triggered release of gentamicin from a gentamicin loaded film 40 and another film 42 composed of clay and gentamicin bilayers. For stability testing, films 40, 42 were formed with 9.5 bilayers. For the release experiments of FIG. 9, the films 40, 42 were formed with 3.5 bilayers.

The amount of gentamicin released was found to be strongly dependent on environmental pH. To test the stability of gentamicin loading (i.e., elution of gentamicin from the films 40 under standard physiological conditions), gentamicin-loaded (clay/PAA)$_{9.5}$ films 40 were immersed in 0.01 M phosphate buffer at pH 7.4 with 0.2 M NaCl. Every 5 days, the thicknesses of the films 40 were measured by contact-mode AFM. The films 40 retained gentamicin for at least 45 days of soaking.

A pH-triggered decrease in PAA charge density at lower pH values resulted in disruption of ionic pairing between gentamicin and carboxylate ions, leading to gentamicin release. To study pH-triggered release of gentamicin from PAA/clay hydrogel films, loaded films 40 having 3.5 bilayers were exposed to 0.01 M phosphate buffer solutions containing 0.2 M NaCl with pH set at various values between 2.5 and 7.5. In contrast to single-component films of poly(methacrylic acid) (PMAA) cross-linked with ethylene diamine (EDA), clay/PAA layers showed greater retention of antibiotics. For example, in separate experiments not included among the Examples, lowering pH to 5 resulted in complete release of gentamicin from the EDA-cross-linked (PMAA)$_{10}$ films within 20 min. However, FIG. 9 shows that only about 50% of the loaded gentamicin was released from the films 40 at pH 3.5.

Continuing to refer to FIG. 9, control experiments with the clay/gentamicin films 42 did not show measurable drug release in a wide pH range from 4 to 7.5. This can be explained in theory by strong electrostatic binding between negatively-charged clay platelets and positively charged gentamicin. A suggested mechanism for pH-triggered release of gentamicin from clay/PAA films combines pH-triggered release of gentamicin from PAA with pH-independent retention of antibiotic molecules as a result of strong interactions with clay platelets. For films such as films 20, 38, 40, the loading capacity of the films 20, 38, 40 can be increased through a facile increase in the number of bilayers within the film, and the entire film 20, 38, 40 can serve as a reservoir for storage of bioactive molecules for on-demand release at a later stage.

EXAMPLE 5

The antimicrobial activity of clay/PAA films was tested in experiments with S. aureus ATCC 12600 bacteria. Gentamicin is known to be active against this particular strain of S. aureus with a minimum inhibitory concentration of 1 μg/mL. The strain was taken from a frozen stock, streaked, and incubated overnight at 37° C. on tryptic soy broth (TSB; Oxoid, Basingstoke, UK) agar plates. After incubation, the plates were stored at 4° C. for up to a month. Pre-cultures of bacteria were made by inoculating a single bacteria colony in 10 mL of tryptic soy broth (TSB; Oxoid, Basingstoke, UK) and incubating at 37° C. in ambient air for 24 hours. These pre-cultures were sonicated at 30 W (Vibra Cell model 375, Sonics and Materials Inc., Danbury, Conn.) on ice 3 times for 10 seconds each, waiting 30 seconds in between, counted using a Bürker Türk counting chamber, and then diluted with TSB to the desired bacterial concentration. A number of Petrifilms (3M Microbiology, St. Paul, Minn.) were labeled and swollen with 1 mL of sterile demineralized water for 30 minutes. Once swollen and the pre-culture had been diluted to the correct concentration, the Petrifilm cover was peeled back and test substrates coated with clay/PAA films were placed in the swollen region with the film surface facing up. A pipet was used to place a 25 μL droplet of bacteria suspension on the upper edge of the test film, and the Petrifilm cover was closed, dispersing the droplet uniformly across the entire surface. The Petrifilm plates were incubated at 37° C. for 48 hours.

The growth of planktonic S. aureus was tested at surfaces of loaded and unloaded clay/PAA films with different numbers of deposited layers using Petrifilm Agar Plates and S. aureus concentrations of $4 \times 10^3$, $16 \times 10^3$, $4 \times 10^5$, $4 \times 10^7$, $2 \times 10^{10}$ bacteria per mL. A droplet size of 25 μL of bacterial inoculums was used, resulting in theoretical bacteria counts of $10^2$, $4 \times 10^2$, $10^4$, $10^6$ and $5 \times 10^8$ bacteria per droplet, respectively.

Figure 10:
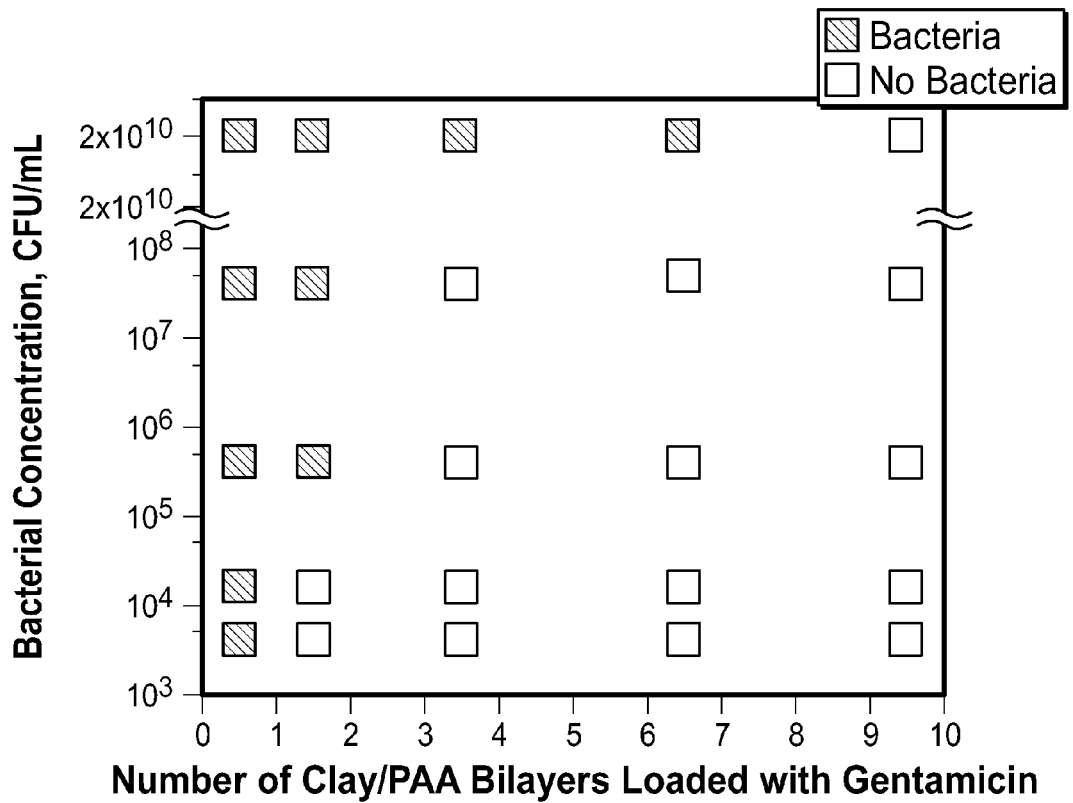
FIG. 10 is a chart indicating the presence or absence of bacterial growth on surfaces of films loaded with an antibiotic according to an embodiment of the present invention.

In every trial, the unloaded films displayed higher bacterial surface coverage than films loaded with gentamicin samples. This confirmed that the antibacterial activity was due to gentamicin, and not due to the clay platelets nor PAA. FIG. 10 is a chart showing the results of the gentamicin trials. At low concentrations of bacteria ($4 \times 10^3$ and $16 \times 10^3$ bacteria/mL), bacterial growth was significantly reduced on the gentamicin-loaded (clay/PAA)$_{0.5}$ film, although still present, and complete inhibition was observed with antibiotic-loaded (clay/PAA)$_{1.5}$ films in every trial. At higher concentrations of S. aureus 12600 ($4 \times 10^5$, $4 \times 10^7$ bacteria/mL), the cutoff for complete inhibition of bacteria inhibition was between 1.5 and 3.5 loaded bilayers. Even when challenged with such a high bacterial concentration as $2 \times 10^{10}$ bacteria/mL, gentamicin-loaded (clay/PAA)$_{9.5}$ films demonstrated complete inhibition of S. aureus growth. In addition, (clay/gentamicin)$_{10}$ films, were antibacterial for concentrations of $2 \times 10^4$, $4 \times 10^4$, and $4 \times 10^5$ bacteria/mL, thereby demonstrating the limited antibacterial activity of such films. As discussed previously, clay/gentamicin films do not release significant amounts of gentamicin over a broad pH range. This suggests that, while contact killing does occur, release of gentamicin from the films is important to maintain a high antibacterial activity.

As a second tool to confirm the antimicrobial activity of the films and to identify any bacteria alive on the films after the Petrifilm tests, samples of (clay/PAA)$_n$ films that had been challenged in the Petrifilm tests with a bacterial concentration of $2 \times 10^{10}$ bacteria per mL were immersed in TSB solution for bacterial regrowth at 37° C. for 12 h. Again, no bacteria were detected by visual observation of the gentamicin-loaded (clay/PAA)$_{9.5}$ films. However, bacteria accumulated on all other gentamicin-loaded and gentamicin-free films (i.e., n=0.5, n=1.5, n=3.5, n=6.5). The results shown in FIG. 10 demonstrate that complete inhibition of bacterial growth at the film surfaces is dependent both on the number of bacteria applied to the film and on the number of bilayers in the film. Bacterial survival decreases with an increase in the number of bilayers within gentamicin-loaded films. This observation suggests that gentamicin absorbed within the entire film, became bioavailable, rather only the gentamicin absorbed within the upper bilayers layers. This may occur because of a release of gentamicin triggered by local decreases in pH associated with bacterial metabolism. The capability of increasing the total amounts of loaded and released gentamicin through a simple control of film thickness, together with the combined mechanism of on-demand delivery and permanent antibacterial activity in the film, makes these films powerful candidates for fighting bacterial infections.

Gentamicin-loaded (clay/PAA)$_{9.5}$ films also showed antibacterial activity against gram-positive bacteria such as *S. epi* ATCC 14990 and *E. coli* ATCC 25922 at concentrations of $4\times10^7$ and $4\times10^9$ of bacteria/mL ($10^6$ and $10^8$ bacteria/sample) (data not shown).

EXAMPLE 6

HFOB 1.19 osteoblast cells and human skin fibroblast cells (HskF) were used for in vitro cytocompatibility experiments A large percentage of cells remained intact and alive after 1 day, 4 days and 7 days of cell growth (data not shown). These results indicate that the clay/PAA films are not cytotoxic and are suitable for coating implants and in bone tissue engineering. The experiments were carried out as follows:

Osteoblast Cell Culture. Cells were cultured in the a medium containing a 1:1 mixture of Ham's F12 medium (Invitrogen, Carlsbad, Calif.) and Dulbeccco's Modified Eagle Medium-Low Glucose (DMEM-LG; Cellgro) supplemented with antibiotic solution (1% penicillin-streptomycin; Sigma) and 10% fetal bovine serum (FBS; Atlanta Biologicals). Cells were incubated in a humidified atmosphere of 5% CO2 at 37° C. with medium change every 3 days. All cells used in this study were between 4 and 6 passages.

Osteoblast Cell Seeding on Films. Silicon wafers coated with PEI(clay/PAA)$_{9.5}$ films were disinfected by dipping into 70% ethanol for one hour followed by three washes in sterile PBS pH 7.4. Those samples were loaded with gentamicin for 2 hours. As controls, wafers coated with as-synthesized, gentamicin-free PEI(clay/PAA)$_{9.5}$ films, as well as bare wafers, disinfected by 70% ethanol, were used. All wafers were then thoroughly washed in fresh medium. The wafers were placed in the wells of a 12-well microtiter plate and a volume of 40 μL of HFOB cell suspension containing $2\times10^4$ cells was pipetted onto each wafer. Cells were allowed to attach for 2 hours followed by addition of 1 mL medium per well. Cultures were maintained for 7 days with medium replacement every other day. After 1, 4, and 7 days, samples were removed and characterized for cell attachment, cell proliferation, live/dead viability and morphological analysis.

Fibroblast Cell Culture. Human skin fibroblast cells (HskF) were used for the evaluation of cell response to the coatings. Cells were cultured in RPMI 1640 media (BioWhittaker) containing PBS, glutamax, and PIS. Cells were incubated in a humidified atmosphere of 5% CO2 at 37° C. Medium was changed every 3 days.

Fibroblast Cell Seeding on Films. All wafers were sterilized by dipping into 70% ethanol and allowed to dry for one hour. Silicon non-pillared wafers (1×1 cm) coated with PEI (clay/PAA)$_{9.5}$ films were placed in the wells of a 12-well microtiter plate with 2 mL of cell suspension containing $7.75\times10^4$ cells/mL. The fibroblast cells were fixated to attach on the samples after 4 days and 7 days. A volume of 1 ml of paraformaldehyde 3.7% (PFA, Sigma-Aldrich) was pipette onto each wafer for 5 minutes, and then replaced with 2 mL of fresh PFA for another 15 minutes. After the entire 20 minutes, PBS was added to cover each sample. After each time point for each sample, the wafers were removed and observed for cell attachment, cell proliferation, and morphological analysis.

EXAMPLE 7

Figure 11:
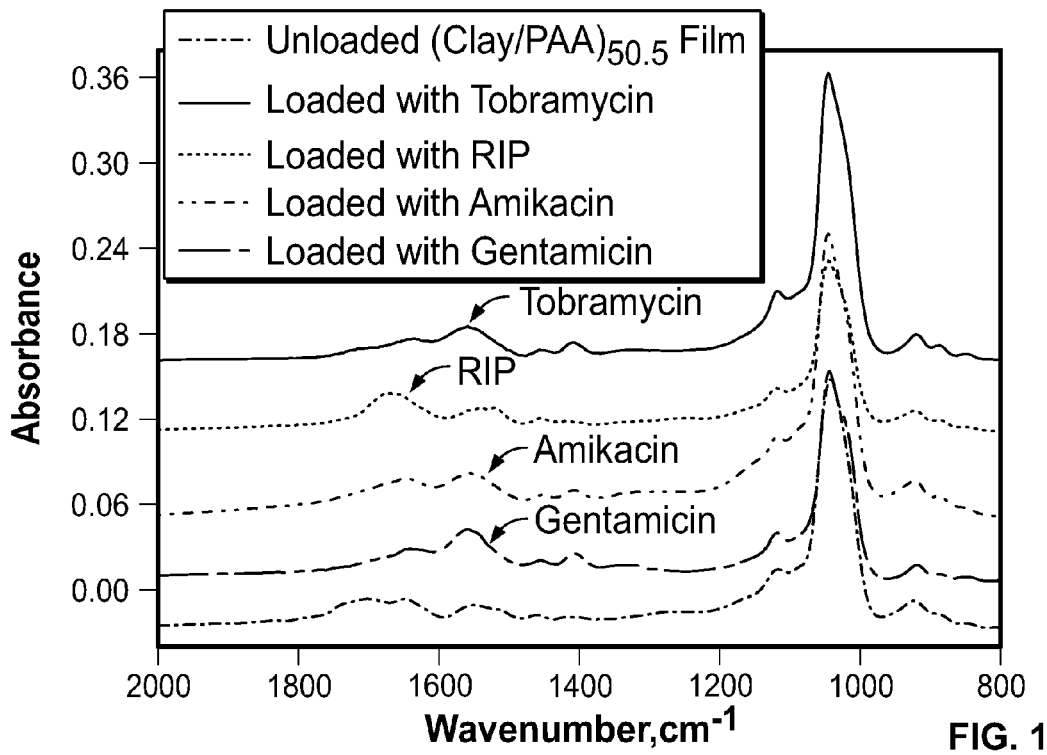
FIG. 11 is a composite chart of infrared spectra of a number of films according to embodiments of the present invention, each film having been loaded with a different type of bioactive molecule.

FIG. 11 is a composite of infrared spectra of a number of (clay/PAA)$_{50.5}$ films, wherein each film has been loaded with a different type of bioactive molecule. Solutions of the bioactive molecules (0.1 mg/mL, 0.01 M phosphate buffer pH 6) were brought into contact with (clay/PAA)$_{50.5}$ films for 3 hours. Referring to FIG. 11, the loading of low-weight antibiotics such as gentamycin, tobramycin and amikacin, and RNAIII-inhibiting peptide YSPWTNF-NH2 (RIP) was demonstrated by the labeled peaks in the FTIR spectra.

EXAMPLE 8

Poly-N-substituted glycines or peptoids have a backbone structure identical to that of peptides, however in peptoids the side chains are appended to amide nitrogens rather than alpha carbons. While peptoids preclude hydrogen bonding due to lack of amide protons, they can form stable polyproline type-1-helices with about 3 residues per turn and a pitch of about 6-6.7 Å when bulky chiral side chains are incorporated. Certain cationic and amphipathic peptoid oligomers (5-17 monomers in length) function as structural and functional mimics of antimicrobial peptides (AMPs) and are protease resistant. Antimicrobial peptoids are tunable by the choice of chain length, sequence, and side chains, allowing undesirable traits (e.g. cytotoxicity) to be minimized with retaining low-micromolar, broad-spectrum antibiotic activity.

Peptoid 1 is a 12 residue long peptoid with of $\frac{1}{3}^{th}$ lysine-like positively charged monomers (NLys) and $\frac{2}{3}^{th}$ phenylalanine-like hydrophobic, aromatic monomers (Nspe) with the repeating sequence H—(NLys-Nspe-Nspe)$_4$-NH$_2$. Peptoid 1 has a demonstrated efficacy against planktonic cells of clinically relevant multi-drug resistant strains of gram-positive and gram-negative bacteria. Also, peptoid 1 is active against *Pseudomonas aeruginosa* biofilms and *Mycobacterium tuberculosis*. Peptoid 1 has also been used as an antifouling agent since it helps in preventing the bacterial growth when immobilized on a surface.

In the present Example, peptoid 1 was loaded within (clay/PAA)$_{10.5}$ films by contacting the films with a 0.1 mg/mL solution of peptoid 1 in 0.01 M phosphate buffer with 0.2 M NaCl at pH 7.5 for 1 hour. Excess peptoid 1 was rinsed off of the films with 0.01 M phosphate buffer at pH 7.5. A bacterial suspension of *S. aureus* MZ-100 ($10^7$ colony-forming units, 50 μL) was seeded onto the films for 5 min and then incubated with 2 mL TSB for 8 hours at 37° C. in 24-well culture plates. Samples were fixed with 4% paraformaldehyde in PBS for 30 min and then rinsed with PBS. For CLSM (Nikon E 1000 with a C1 confocal system) visualization, the specimens were then stained with 0.5 mg/mL fluorescein isothiocyanate (FITC, Sigma) in PBS for 30 min, rinsed with PBS and then with 70% ethanol, and then dried in the air.

As-synthesized (clay/PAA)$_{10.5}$ films were found to be covered by *S. aureus*. In contrast, *S. aureus* and other bacteria were absent from the films that had been loaded with peptoid 1. The absence of bacteria demonstrates preservation of peptide antibacterial properties against *S. aureus* MZ-100 after incorporation within (clay/PAA)$_{10.5}$ films.

EXAMPLE 9

In addition to LbL methods, clay/PAA films can be also prepared by adsorption from clay/PAA mixtures. A suitable clay/PAA mixture was prepared by mixing equal volumes of clay and PAA solutions at pH 2.0, to provide final concentrations of 0.5 mg/ml of clay and 0.2 mg/mL, of PAA, followed by pre-incubation of the mixture at room temperature for 45 min. A silicon wafer was prepared with a BPEI precursor monolayer as described in Example 1. The prepared wafer was dipped into the mixture at pH 2 and incubated for 40 min. After taking the silicon wafer from the clay/PAA mixture, it was rinsed with buffer at pH 2 and dried. This procedure resulted in the deposition of a 17.2-nm-thick clay/PAA film, as measured by ellipsometry. The use of a 2-fold higher concentration of clay and PAA components in the mixture resulted in deposition of thicker clay-PAA films (i.e., about 40 nm thickness).

EXAMPLE 10

Clay/PAA films were deposited on the surfaces similar to those of silicone catheters. Prior to adsorption of the BPEI priming layer, silicone coupons (2 cm×2 cm) were treated in ozone plasma cleaner (Harrick Scientific Products, Pleasantville, N.Y.) for 2 min. This resulted in changes of the water contact angle (CA) of the coupon surface from 115° to 19° (before and after the plasma treatment, respectively). Clay/PAA films were then deposited using the LbL technique as described in Example 1. Deposition of 9.5 bilayers of clay-PAA resulted in a change of CA to 65°. After being loaded with gentamicin, the film remained stable during storage at room temperature (about 20° C.) under dry conditions and in PBS at pH 7.4, and while refrigerated at 4° C. for at least 10 days.

EXAMPLE 11

Figure 12:
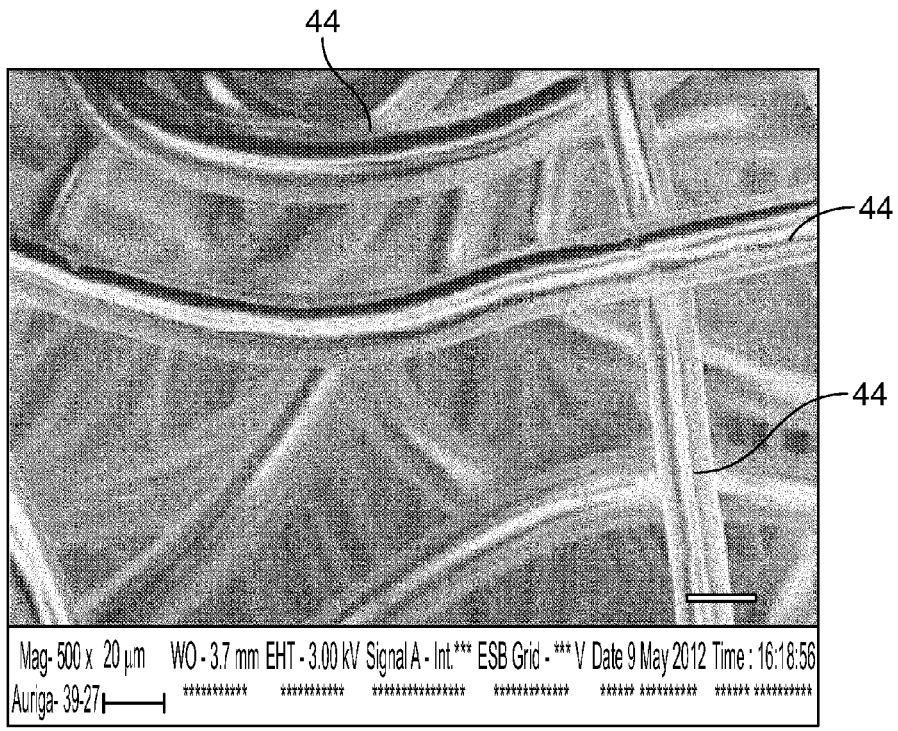
FIG. 12 is a SEM image of a porous substrate before deposition of a film according to the present invention onto a porous substrate.
Figure 13:
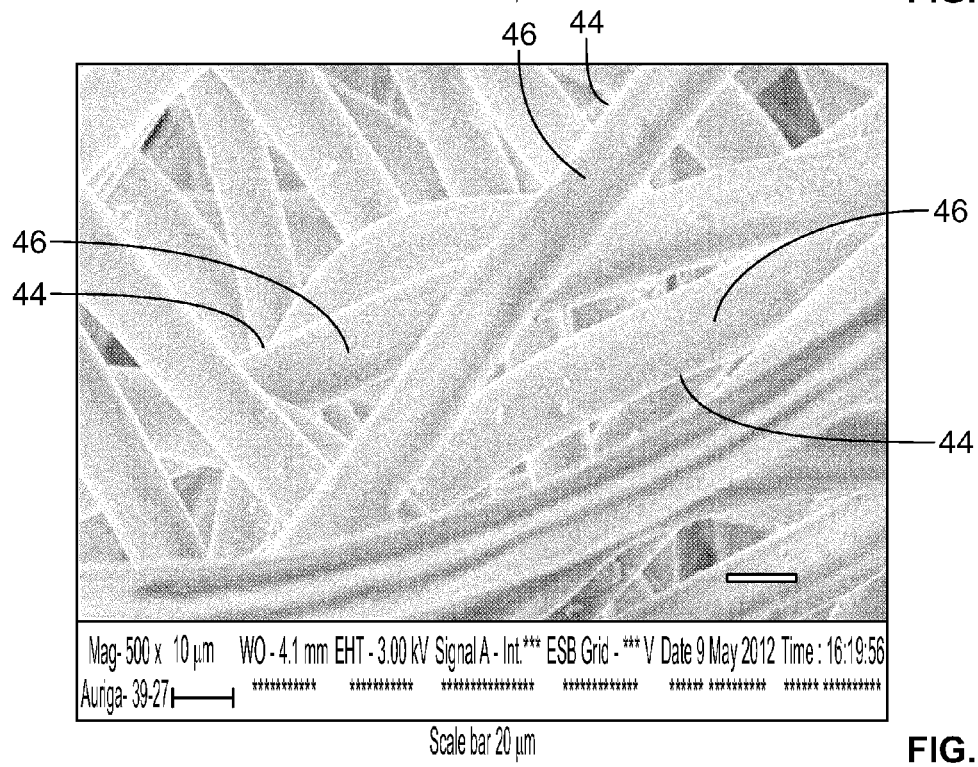
FIG. 13 is a SEM image of the porous substrate of FIG. 12 after deposition of a film according to the present invention onto the porous substrate.

FIGS. 12 and 13 are SEM images of fibers 44 of a porous substrate (i.e., Dacron® coupons) before (FIG. 12) and after (FIG. 13) deposition of a film 46 of the present invention onto the porous substrate. The coupons were treated in ozone plasma cleaner (Harrick Scientific Products, Pleasantville, N.Y.) for 2 min. This treatment resulted in Dacron® surfaces that were completely wettable by water (CA=0°). BPEI was then deposited on the surfaces of the coupons as a precursor layer. Deposition of clay/PAA films was then performed using the LbL technique as described in Example 1. The Dacron® coupons remained completely wettable by water after deposition of the films 46. Loading of gentamicin within the films 46 resulted in a drastically enhanced hydrophobicity of Dacron® (CA change from 0° to 120°). Moreover, as indicated by CA and SEM measurements, gentamicin was retained within the film 46, and the film 46 remained stable during storage at room temperature (+20° C.) under dry conditions and in PBS at pH 7.4, and while refrigerated at 4° C. for at least 30 days.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention, as defined by the appended claims.

We claim:

1. A film for the retention and controlled release of organic and inorganic molecules consisting of at least one phyllosilicate clay and at least one organic polyanion, wherein said film is a built-up layered film including layers of said at least one phyllosilicate clay alternating with layers of said at least one organic polyanion and each of said layers has a net negative charge.

2. The film of claim 1 wherein said film swells in the presence of a polar liquid.

3. The film of claim 1, in combination with a plurality of molecules absorbed within said film.

4. A method of preparing the film of claim 1, comprising the steps of:
   (a) depositing a first solution or dispersion of a first substance onto a substrate for a period of time sufficient to form a self-assembled first layer of the first substance on the substrate;
   (b) depositing a second solution or dispersion of a second substance onto the first layer for a period of time sufficient to form a self-assembled second layer of the second substance on the first layer of the first substance;
   (c) depositing a third solution or dispersion of the first substance onto the second layer for a period of time sufficient to form a self-assembled third layer of the first substance on the second layer; and
   (d) depositing a fourth solution or dispersion of the second substance onto the third layer for a period of time sufficient to form a self-assembled fourth layer of the second substance on the third layer, wherein the first substance includes one of an organic polyanion and an exfoliated phyllosilicate clay and the second substance includes the other one of the organic polyanion and the exfoliated phyllosilicate clay.

5. The method of claim 4, comprising the further step of immersing the film in a solution of molecules having neutral or positive electrostatic charges for a time sufficient to allow some of the molecules to be absorbed into the film.

6. The method of claim 5, wherein the film is in a liquid environment, said method comprising the further step of adjusting the pH of the liquid environment to a pH at which at least some of the molecules absorbed into the film are released from the film into the liquid environment.

7. The method of claim 6, wherein the molecules are bioactive molecules and the bioactive molecules remain bioactive while absorbed within the film.

8. An article, comprising a surface and a the film of claim 1 adhering to said surface.

* * * * *